United States Patent [19]
Sato et al.

[11] Patent Number: 4,891,493
[45] Date of Patent: * Jan. 2, 1990

[54] NARROW GAP ARC WELDING PROCESS AND APPARATUS THEREFOR

[75] Inventors: Shozo Sato; Toshikazu Shimoyama; Susumu Shono; Osa Matsumoto; Hiromasa Kamei; Takehiko Imada, all of Takasago, Japan

[73] Assignee: Mitsubishi Jukogyo Kabushiki Kaisha, Tokyo, Japan

[*] Notice: The portion of the term of this patent subsequent to Sep. 2, 2003 has been disclaimed.

[21] Appl. No.: 943,840

[22] Filed: Dec. 11, 1986

Related U.S. Application Data

[63] Continuation of Ser. No. 306,514, Sep. 28, 1981, abandoned.

[51] Int. Cl.$^4$ ................................................. B23K 9/00
[52] U.S. Cl. .......................... 219/137 R; 219/125.12; 219/127.8
[58] Field of Search .............. 219/137 R, 136, 125.12, 219/137.8

[56] References Cited

U.S. PATENT DOCUMENTS

| | | | |
|---|---|---|---|
| 1,678,941 | 7/1928 | Helman | 72/196 |
| 1,907,051 | 5/1933 | Emery | 219/137 R |
| 2,824,213 | 2/1958 | Shearer | 219/137.8 |
| 3,576,966 | 5/1971 | Sullivan | 219/137.8 |
| 3,786,225 | 1/1974 | Gibbs | 219/125.12 |
| 4,074,105 | 2/1978 | Minehisa | 219/125.12 |
| 4,254,322 | 3/1981 | Asano | 219/137.8 X |

FOREIGN PATENT DOCUMENTS

| | | | |
|---|---|---|---|
| 2225018 | 5/1972 | Fed. Rep. of Germany | 219/136 |
| 142305 | 6/1980 | Fed. Rep. of Germany | 219/125.12 |
| 56-151176 | 11/1981 | Japan | 219/125.12 |
| 56-154284 | 11/1981 | Japan | 219/125.12 |

*Primary Examiner*—H. Broome
*Assistant Examiner*—Lincoln Donovan
*Attorney, Agent, or Firm*—Wyatt, Gerber, Burke and Badie

[57] ABSTRACT

A narrow gap arc welding process comprises steps of defining a narrow gap between a pair of members to be welded arranged so as to face each other at a predetermined distance, feeding a consumable electrode into a guide cylinder which is movable along the narrow gap, and generating electric arc between the tip of the consumable electrode and the members to be welded to unite them with each other, wherein the consumable electrode, while being deformed plastically to have a wave-like pattern with a pitch of about 10 to 30 mm and a molding width of about 2 to 5 mm depending on welding conditions, is fed into the narrow gap with the direction of the molding width being in line with the direction of the width of the narrow gap and the direction of the tip of the consumable electrode being changed so as to point out one after the other facing edge of the members to be welded alternately at a high frequency. Also, an apparatus for practicing the process is described.

2 Claims, 7 Drawing Sheets

NARROW GAP ARC WELDING PROCESS AND APPARATUS THEREFOR

This invention relates to a narrow gap welding process and an apparatus therefor. More particularly, this invention relates to a welding process and apparatus capable of preventing occurrence of welding defects such as lack of fusion and the like.

Figure 1:
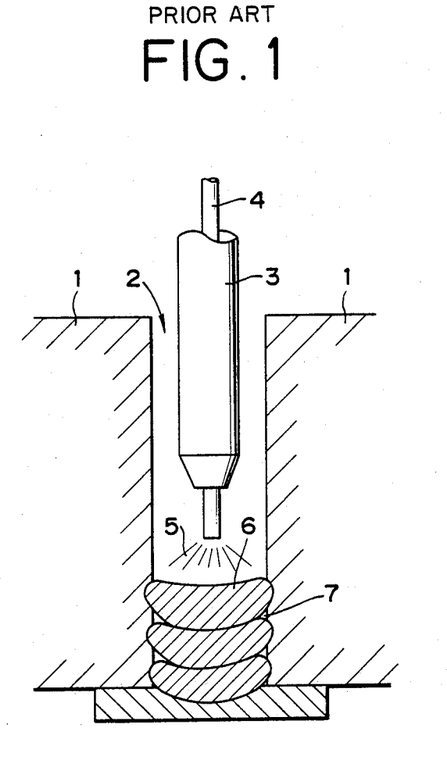
FIG. 1 is a schematical view of a conventional narrow gap arc welding apparatus in cross section showing the state of contentional narrow gap arc welding.

Recently rapid progress has been made in welding technology and as a result a welding process has been developed in which the gap between members to be welded is made narrower than ever in order to minimize period of time during which welding operation is carried out in the case where large, thick plate constructions are to be welded. This welding process which is called a narrow gap welding process is used chiefly in arc welding processes such as MIG welding, $CO_2$ gas shielded arc welding and submerged arc welding. The principle of the narrow gap arc welding process is as shown in FIG. 1. That is, a pair of thick plates or members 1 to be welded are placed so as to face each other to define therebetween a narrow gap 2 along which a guide cylinder 3 is moved, and through the guide cylinder 3 is fed a consumable electrode 4, while electric arc 5 is generated between the tip of the consumable electrode 4 and the members 1 to be welded to form a deposited zone 6 through which a pair of the members 1 are welded to each other.

According to the conventional narrow gap ar welding process, welding operation can be carried out at a high efficiency since it is unnecessary to form a special groove in the members 1 to be welded by cutting and use of a narrow gap reduces the amount of deposited zone 6 to be formed.

However, in such conventional narrow gap arc welding process, it is difficult to direct the tip of the consumable electrode 4 toward the corners formed by the members 1 to be welded and the deposited zone 6 since the width of the gap is small, and therefore it has hitherto been often the case that lack of fusion occurs between the members 1 to be welded and the multilayered deposited zone 6, thus forming an undeposited zone 7.

Therefore, it is an object of this invention to provide a narrow gap arc welding process and apparatus therefor in which occurrence of undeposited zone which conventional narrow gap arc welding processes suffer is prevented.

Another object of this invention is to provide a welding wire feeding device capable of deforming welding wires plastically to have a special molding pattern which are useful for use in the above process.

As a result of extensive investigation this invention has been achieved which provides, in one aspect, a narrow gap arc welding process comprising defining a narrow gap between a pair of members to be welded arranged so as to face each other at a predetermined distance, feeding a consumable electrode into a guide cylinder which is movable along the narrow gap, generating electric arc between the tip of the consumable electrode and the members to be welded to unite them with each other, wherein the consumable electrode, while being deformed plastically to have a wave-like pattern with a pitch of about 10 to 30 mm and a molding width of about 2 to 5 mm depending on welding conditions, is fed into the narrow gap with the direction of the molding width being in line with the direction of the width of the narrow gap and the direction of the tip of the consumable electrode being changed so as to point out one after the other facing edge of the members to be welded alternately at a high frequency.

In another aspect, this invention provides a narrow gap arc welding apparatus which comprises a welding head comprising a guide cylinder which is movable along a narrow gap defined by a pair of members to be welded and through which a consumable electrode is fed, a means for generating electric arc between the consumable electrode and the members to be welded, and a molding means comprising a pair of gears capable of deforming plastically the consumable electrode to have a wave-like pattern with a pitch of about 10 to 30 mm and a molding width of about 2 to 5 mm depending on the welding conditions and capable of feeding the consumable electrode into the guide cylinder.

Further, this invention provides a welding wire feeding device comprising a pair of gears being in mesh with a clearance which permits take up of a welding wire therebetween and being so arranged that they can rotate synchronously, with the tooth crests of one gear being in contact with the deddenda of the other gear wherein a flat portion is provided on each of the tooth crests and of the deddenda in the gears both having a triangular wedge-like form and serving to bend and feed the welding wire.

Hereinafter, the narrow gap arc welding process and apparatus therefor including welding wire feeding device according to this invention will be explained in greater detail with reference to preferred embodiments thereof applied to MIG welding.

Other objects and advantages of this invention will be apparent from the following description referring to accompanying drawings.

FIGS. 7(a) and (b) are each a front view of a welding wire feeding device comprising a pair of molding gears and show bending of welding wires.

FIGS. 8(a), (b) and (c) are each a perspective view of a molded welding wire having a different molding width.

FIGS. 9(a), (b), (c), (d) and (e) are each a schematic view of another type of molded welding wire.

Figure 2:
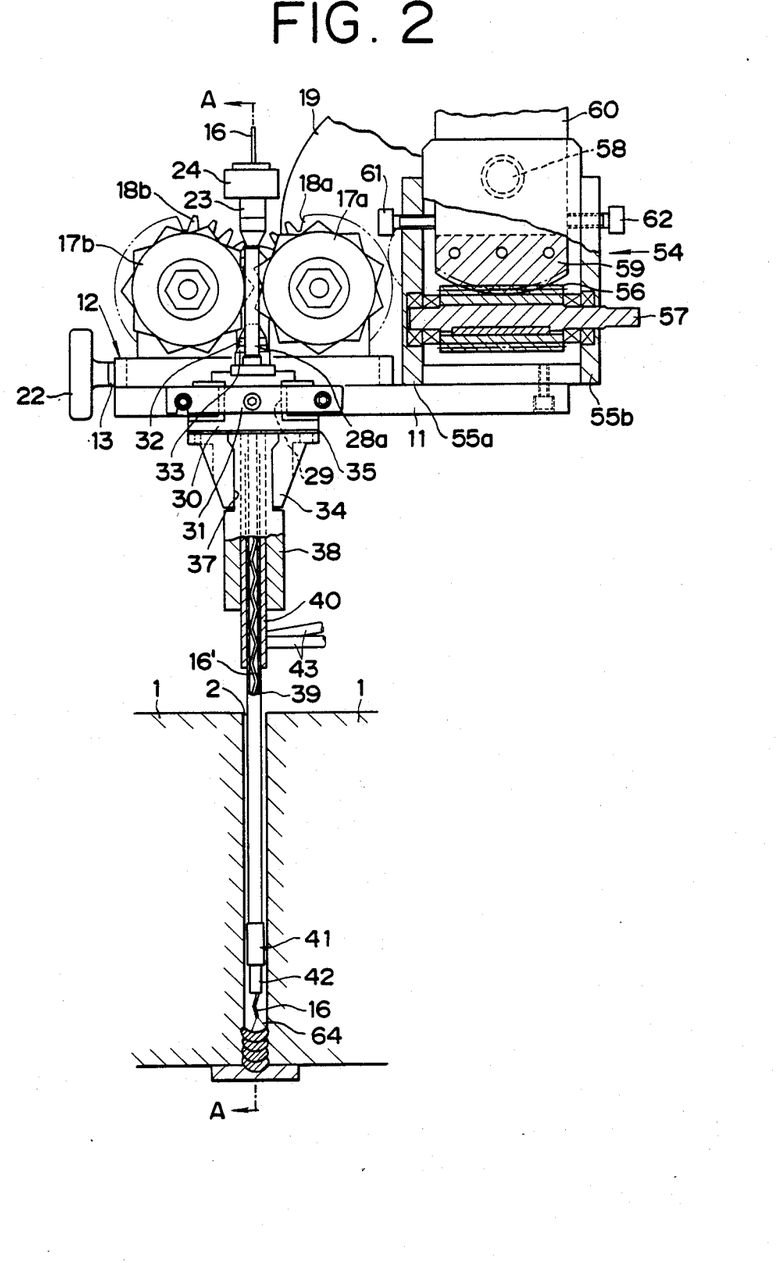
FIG. 2 is a front view of a narrow gap arc welding apparatus according to one embodiment of this invention in partial cross section.
Figure 3:
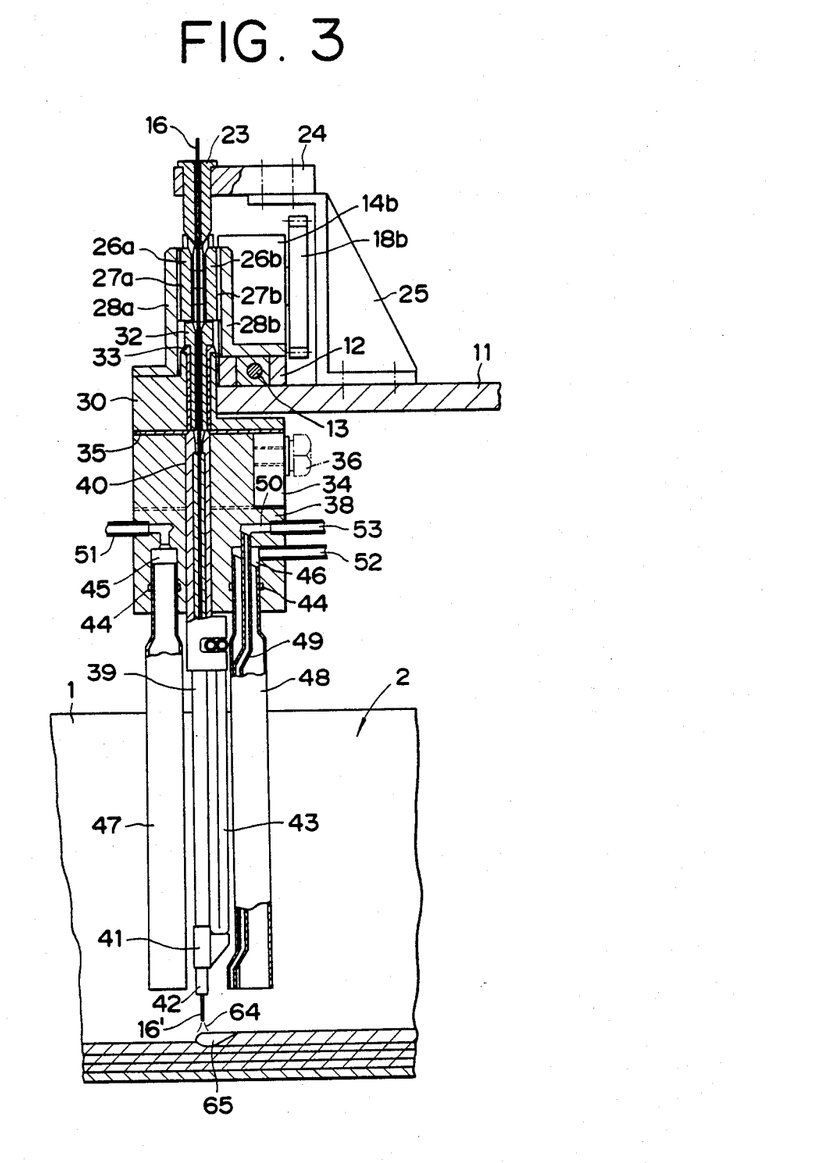
FIG. 3 is a cross-sectional view of the apparatus shown in FIG. 2 taken along the line A—A'.
Figure 4:
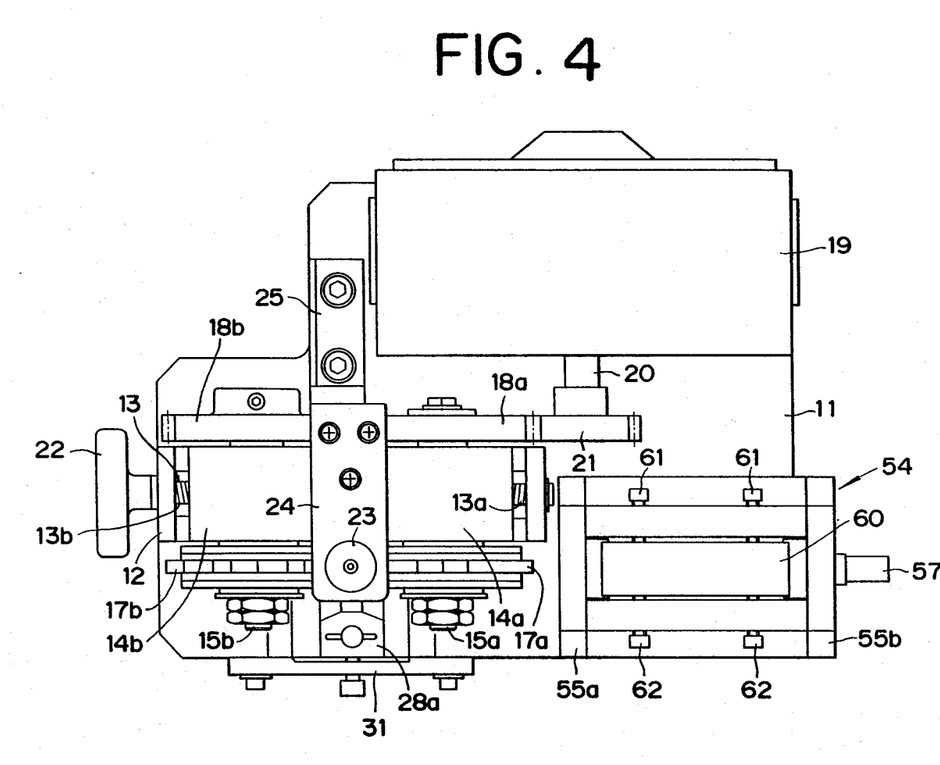
FIG. 4 is a plan view of the apparatus shown in FIG. 2.

Now, referring to FIG. 2 showing in frontal, partial cross-sectional view arrangement of the apparatus according to one embodiment of this invention relative to members to be welded, FIG. 3 showing a cross-sectional view thereof taken along the line A—A' in FIG. 2 and FIG. 4 showing a plan view thereof, reference numeral 11 denotes a base plate of a welding head, which is connected to a slider movable both in vertical and horizontal directions in the welding head. On the base plate 11 is provided a slider 12 and a slider shaft 13 is provided with threaded portions 13a and 13b having different threading directions (in this embodiment the threaded portion 13a is a right hand screw while the threaded portion 13b a left hand screw). The respective threaded portions 13a and 13b are in a threading engagement with bearings 14a and 14b, respectively, which support rotary shafts 15a and 15b, respectively, each of which has at one end thereof a molding gear 17a or 17b for deforming plastically a welding wire (consumable electrode) 16 having a straight linearity and feeding the deformed or molded welding wire to a weld zone.

The molding gears 17a and 17b are capable of deforming plastically the welding wire 16 into a bent welding wire 16' having a predetermined shape or pattern with a pitch of about 10 to 30 mm and a molding width (width of bend) of about 2 to 5 1 mm. The molding gears 17a and 17b are insulated completely from the bearings 14a and 14b and the like parts with an insulator. The rotary shafts 15a and 15b have at the other ends thereof driven gears 18a and 18b, respectively.

On the other hand, a motor 19 is positioned on the base plate 11, an output shaft 20 of which is provided with a driving gear 21 which is engaged with the driven gear 18a. With this construction, the rotation of the output shaft 20 of the motor 19 is transmitted to the respective molding gears 17a and 17b through the driving gear 21, the driven gears 18a and 18b and the rotary shafts 15a and 15b.

Since the bearings 14a and 14b are connected with the threaded portions 13a and 13b, respectively, on the slider shaft 13 having different threading directions as described above, the positions of the molding gears 17a and 17b together with those of the bearings 14a and 14b, hence the distance between the axes of the molding gears 17a and 17b, can be varied by manual rotation of a handle 22 attached to an end of the slider shaft 13 and as a result the molding width W of the welding wire can be changed.

Just above the space defined by the molding gears 17a and 17b is provided a guide member 23 for guiding the welding wire 16 fed from a coil (not shown) into the space between the molding gears 17a and 17b. The guide member 23 is supported on a supporting plate 24 made of an insulating material, which is attached to a bracket 25 secured on the base plate 11. Along both the side extremities of the space defined by the molding gears 17a and 17b are provided guide members 26a and 26b for preventing the welding wire from deviating from the space defined by the molding gears 17a and 17b. The guide members 26a and 26b are supported through insulating plate 27a and 27b, respectively, on brackets 28a and 28b, respectively.

Below the space defined by the molding gears 17a and 17b there is provided a slot 29 on the base plate 11, in which slot an upper supporting plate 30 having a substantially I-form is detachably mounted from the direction at right angles to the direction along which the molding gears 17a and 17b are arranged In other words, the upper supporting plate 30 is mounted in a cassette-like manner.

In order to prevent the upper supporting plate 30 from being detached out of the base plate 11, a stopper plate 31 for holding the edge of the upper supporting plate 30 is provided on the base plate 11. On the upper support 31 is supported an upper guide cylinder 32 through an insulating material 33 just below the space defined between the molding gears 17a and 17b. The bent welding wire 16' reformed between the molding gears 17a and 17b is immediately introduced into the guide cylinder 32.

On the lower surface of the upper supporting plate 30 is connected with bolts a lower supporting plate 34 through an insulating material 35. The lower supporting plate 30 also serves as a connector for a secondary cable from a welding current source and for this purpose is provided with a fitting portion 36.

The lower supporting plate 34 is provided with a slot 37 in which a supporting block 38 is arranged. The supporting block 38 is mounted detachably in a cassette-like manner detachable in a horizontal direction and after arrangement it can be fixed by tightening a bolt only slightly.

The supporting block 38 bears through a reinforcing cylinder 40 a lower guide cylinder 39 which is positioned, when mounted on the lower supporting plate, so as to be in line with imaginary extension of the upper guide cylinder 32, and the bent welding wire 16' is introduced through the lower guide cylinder 39 which has a sufficient length so that it can be inserted in the narrow gap and guide the bent welding wire 16' to the weld zone. Further, the lower guide cylinder 39 has a flattened portion in the halfway along its length so that twisting of the bent welding wire 16' during feeding can be prevented. On the top of the lower guide cylinder is provided through a tip fitting member 41 a conducting tip made of chromium copper having a good conductivity or tungsten. The reinforcing cylinder 40 is also made of materials having a good conductivity. It cover the lower guide cylinder 39 halfway along its length, and holds a water-cooled cylinder 43 on the top thereof. The water-cooled pipe 43 is in contact with the lower guide cylinder 39 and extends up to the tip fitting member 41 where it is soldered and bent.

The supporting block 38 is provided, in front of and at the back of the lower guide cylinder 39, etc., with nozzle connecting orifices 45 and 46 each provided with an O-ring 44, and a front shield gas nozzle 47 and a rear shield gas nozzle 48 are inserted in the nozzle connecting orifices 45 and 46, respectively. The nozzles 47 and 48 have a circular cross section at their ends which are inserted in the orifices but the lower portions are processed so as to have a flat surface (elliptical cross section) so that they can be introduced into the narrow gap at a sufficient depth.

Through the rear shield gas nozzle 48 is led a welding bead forming nozzle 49 the tip of which is taken out to the side of the conducting tip 42 on the top of the rear shield gas nozzle 48. Shield gas passed through the welding bead forming nozzle 49 is supplied to the rear portion of the molten pool and serves to control the shape of the welding bead.

The upper edge of the nozzle 49 is so designed that it can be inserted in an auxiliary orifice 50 when the rear shield gas nozzle 48 is inserted into the nozzle connecting orifice 46. The nozzle connecting orifices 45 and 46 and auxiliary orifice 50 are connected with shield gas feed pipes 51, 52 and 53, respectively. The position or depth of insertion of either shield gas nozzle 47 or 48 may be adjusted freely unless such deviates from within the O-ring 44 on the supporting block 38. This adjustment is advantageous especially when members to be welded ar pipes of a small diameter and the like and when shieldability can be increased by adjusting the position of the shield gas nozzles 47 and 48 to become slightly lower than that of the conducting tip 42.

On the other hand, a leveling mechanism 54 for the welding head is provided on the base plate 11. The mechanism 54 comprises brackets 55a and 55b which are provided on the base 11 and which support a worm 56 through a worm shaft 57 formed integral thereto, a worm wheel 59 hinged on a shaft 58 engaged with the worm 56, and a slider which is movable vertically and horizontally in the welding head and which is connected with the worm wheel 59 through a connecting plate 60. By rotating the worm shaft 57 the angle formed by the connecting plate 60 and the base plate 11 is changed, thereby changing the posture of the welding head. Reference numerals 61 and 62 denote bolts for preventing rattling of the apparatus after adjustment.

In the apparatus according to this embodiment, the upper supporting plate 30 and the supporting block 38 are assembled in a cassette-like manner, and the shield gas nozzles 47 and 48 are detachable. Therefore, assembling and exchange of parts are very easy.

Welding operation in the narrow gap 2 defined by a pair of members 1 to be welded facing each other is carried out using the apparatus having the above construction as follows.

That is, the welding wire 16 having a straight linearity supplied from the coil is led through the guide member 23 into the molding gears 17a and 17b which are driven and rotated. Thus, the welding wire 16 is deformed plastically to form a bent welding wire 16' which is fed through the upper guide cylinder 32. The bent welding wire 16' is introduced from the upper guide cylinder 32 into the lower guide cylinder 39. Then, electric current is applied to the conducting tip 42 on the top of the guide cylinder 39 to generate electric arc between the members 1 to be welded and the wire is deposited in the narrow gap 2.

The welding wire 16 is fed at the same speed as the speed at which the bent welding wire 16' is consumed. On the other hand, during welding operation, shield gas is supplied from the shield gas nozzles 47 and 48 in the front of and at the back of the weld zone. In this manner, welding of a pair of members 1 through a deposited zone proceeds.

Considering the procedure of welding in greater detail, since it is formed at a constant pitch as a result of complete plastic deformation the welding wire 16 has a shape or pattern which remains the same not only during its passage through the guide cylinders 32 and 39 but also after passing through the conducting tip 42. Further, since it is bent with a predetermined amount of angle (bending angle $\theta$) a welding arc 64 with a corresponding predetermined amount of angle is generated which oscillates horizontally to and fro at a high frequency. As a result a molten pool 65 which formed is swung in the direction of the narrow gap toward one after the other of the facing walls of the members to be welded, and the walls are molten by heat secondarily generated in the molten pool 65.

Therefore, in the welding operation according to this invention, it is sufficient to adjust the position of the welding arc, which visually appears to display a single movement or seems to be a single unit arc, so as to be positioned at the center of the width of the narrow gap but such a precise operation as adjustment of the position of the welding arc so as to point out the corners formed by the walls of the members to be welded defining the narrow gap and the bead is unnecessary. Another advantage of the welding operation according to this invention is in that blow holes do not tend to be formed since the molten pool 65 is swung vigorously. Further, since there is no change in the shape or pattern of the bent welding wire 16' even after passage through the conducting tip 42, the welding operation need not be carried out with a high sensitivity to changes in the distance between the conducting tip 32 and the bead (i.e., length of projection).

Further, reasons why the welding wire 16 should be molded at a pitch of about 10 to 30 mm with a molding width of about 2 to 5 mm will be explained hereinafter.

Figure 5:
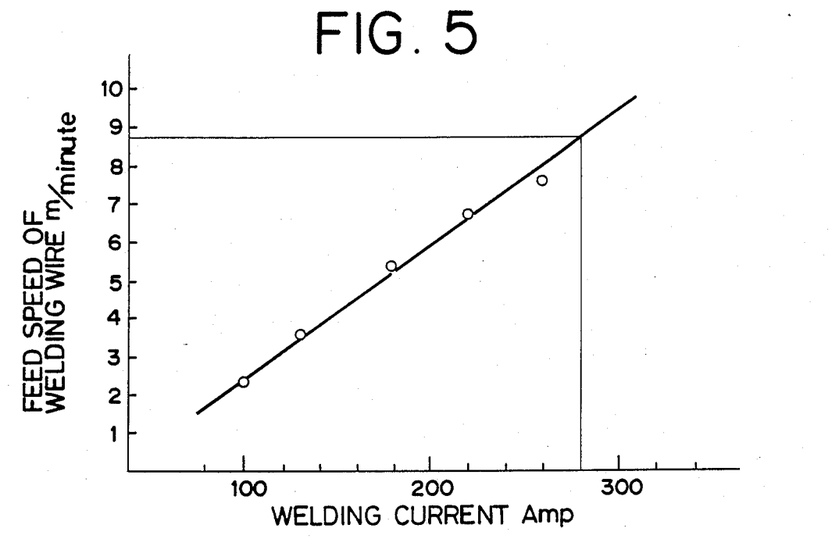
FIG. 5 is a graph representing the relationship between welding current and welding wire feed speed.

Firstly, as for the pitch of the bent welding wire 16', it is to be noted that the relationship between welding current and welding wire feed speed is as shown in FIG. 5 in the case where welding operation is carried out under the following welding conditions:

Diameter of welding wire: 1.2 mm
Shield gas: Ar+20% $CO_2$
Welding current source: Direct current (pulse)

Now, assuming that the pitch at which a welding wire is molded is 20 mm and the welding current to be used is 280 Amp, the rate of deposition of the welding wire is 8.8 m/min. In this case, since a unit pitch is 20 mm, the frequency at which the tip of the welding wire is directed to point out one after the other of the walls defining the narrow gap is 440 cycles/min. Further, when a unit pitch is 10 mm the frequency is about 880 cycles/min., while about 290 cycles/min. of frequency is obtained with a unit pitch of 30 mm. Since the molding pitch is substantially in direct proportion to the pitch of the tooth of the gears 17a and 17b the diameters of the gears 17a and 17b must be larger when the molding pitch is larger than 30 mm, which is undesired in view of difficulty in minimizing the size of the apparatus and of reduction in the frequency. On the contrary, with a unit pitch of less than 10 mm, much larger force is required in plastic deformation of a welding wire through dependent on the properties of the material constituting. This is disadvantageous in view of capacity of the feed motor 19 and of shorter period of time in which the tip of the welding wire is directed to point out the walls defining the narrow gap.

Secondly, as for molding width W of the bent welding wire 16', there is a proper molding width corresponding to the width of the narrow gap. In the narrow gap arc welding operated with a width of the gap of 9 to 14 mm a certain range of molding width between 2.0 mm and 5.0 mm gives rise to good weld zone which is free of weld defects.

Figure 6:
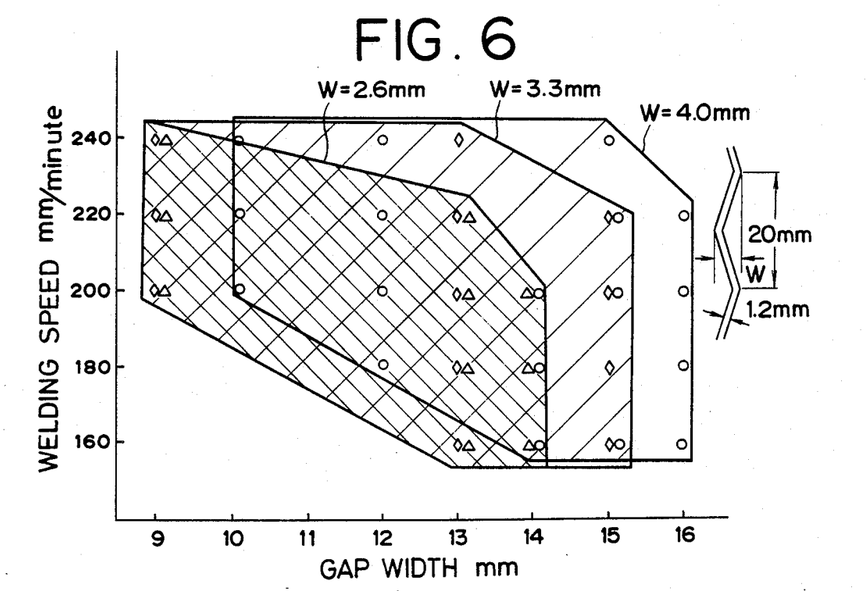
FIG. 6 is a graph representing the relationship between the width of a gap and a proper molding width of a welding wire.

FIG. 6 shows an example of the relationship between the width of the gap and proper molding width in a narrow gap MIG welding process. In this case, satisfactory weld penetration is obtained with the sam molding width of welding wire even when the width of the gap is changed in an amount of several millimeters.

In order to adjust the molding width W of the welding wire 16 precisely the apparatus according to this invention is provided with a mechanism shown in FIGS. 2, 3, 7(a) and 7(b). As stated hereinbefore, this mechanism is designed such that the bearings 14a and 14b in a threading engagement with the threaded portions 13a and 13b, respectively, on the slider shaft 13 having opposite threading directions are moved by rotating the slider shaft 13 to cause the molding gears 17a and 17b together with the bearings 14a and 14b to come closer to or remote from each other.

Figure 7:
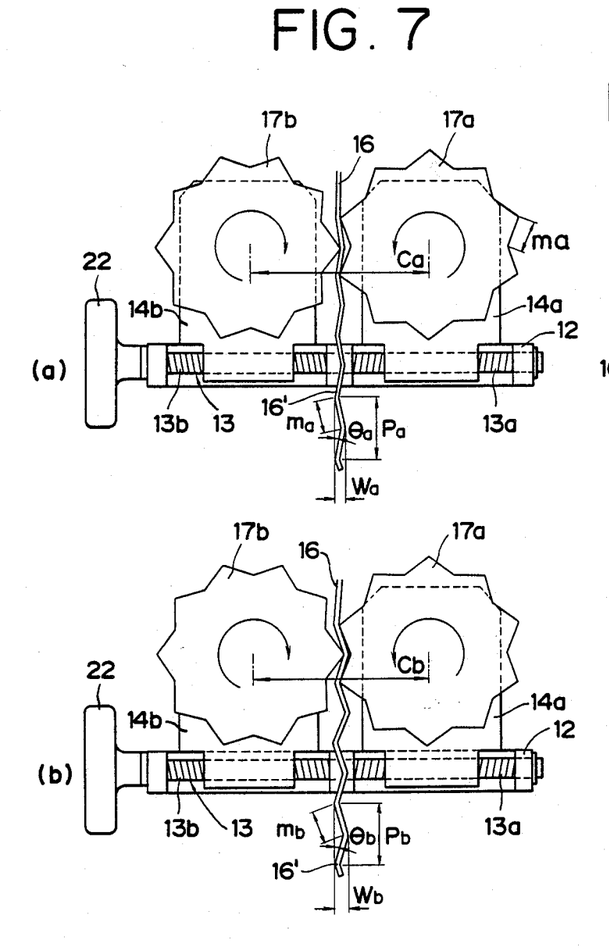
Figure 8:
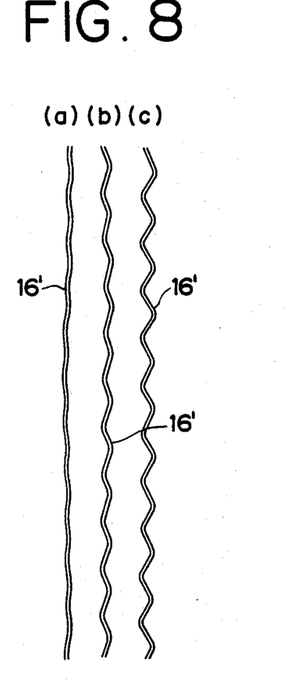

FIG. 7(a) shows the state in which molding of a welding wire is carried out with the distance Ca between the axes of the molding gears 17a and 17b is slightly larger than the distance Cb between the axes shown in FIG. (b). Between the two bent welding wires 16' obtained in the above two situations there exists the following relationship:

If Ca>Cb, then, L≧ma=mb,

Pa>Pb,

Wa>Wb, and $\theta a < \theta b$ where

Figure 9:
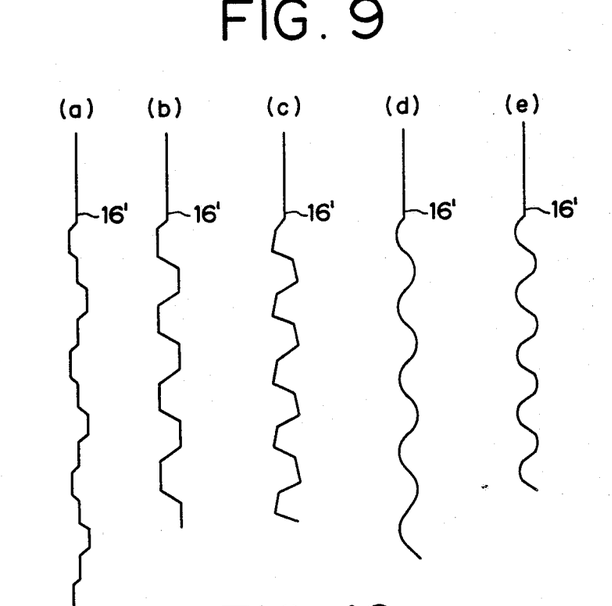
Figure 10:
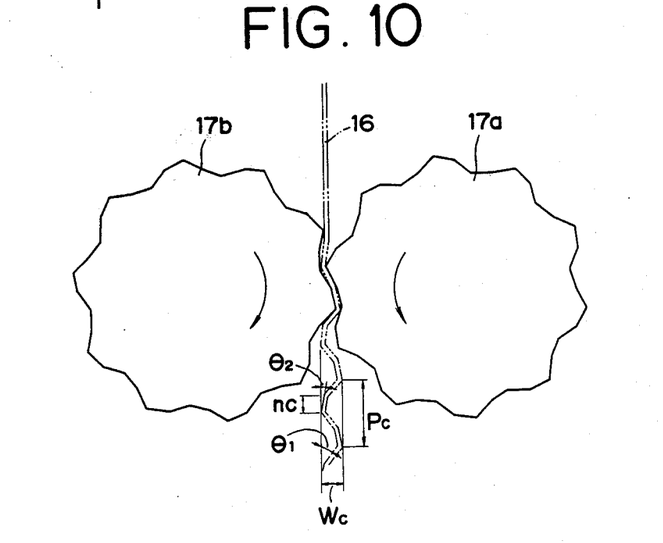
FIG. 10 is a front view of molding gears adjusted to produce a molded welding wire as shown in FIG. 9(c).

Ca, Cb: Distance between the axes of gears,

L: Length of gear tooth, ma, mb: Length of side of bent welding wire,

Pa, Pb: Molding pitch, $\theta a$, $\theta b$: Bending angle of bent welding wire, and Wa, Wb: Molding width FIGS. 8 (a), (b) and (c) show examples of bent welding wires 16' with various values of molding width W. Further, welding wires 16 can be plastically deformed to have various special molding patterns as shown in FIGS. 9(a), (b), (c), (d) and (e) by use of molding gears 17a and 17b with different gear tooth patterns. For example, using the molding gears 17a and 17b as shown in FIG. 10, bent welding wire 16' as shown in FIG. 9(c) can be obtained. This type of welding wire 16' is intended to exhibit the same effect as will be given by ordinary weld oscillation, and for this purpose a portion of a length of Nc with an extremely small degree of slope is provided in every unit pitch of a length of Pc. By the provision of this portion welding arc can stop at both the extremities of the narrow gap, resulting in prolonged arcing time at both the end walls defining the narrow gap to improve effect of preventing occurrence of lack of fusion. The angle $\theta_2$ formed in the portion Nc is intended to give, though slight, directionability toward the end walls defining the gap to the welding wire even when it stops at each extremity of the narrow gap.

As stated in the foregoing, according to this invention, a welding wire can be deformed plastically at a predetermined pitch and with a predetermined molding width to have a wave-like pattern and fed to a weld zone by use of a pair of molding gears to direct the tip of the welding wire to point out one after the other of the facing walls of the members to be welded alternately so that good deposited zone which is free of weld defects such as lack of fusion can be obtained. In addition, since during the welding operation according to this invention welding arc oscillates at a high frequency to swing a molten pool blow holes hardly occur. Further advantage of the apparatus of this invention is in that because of simplicity in construction troubles seldom or never occur, maintenance is easy and cost for production is cheap.

While the invention has been described in detail and with reference to specific embodiments thereof, it will be apparent to one skilled in the art that various changes and modifications can be made therein without departing from the spirit and scope thereof.

What is claimed is:

1. A narrow gap arc welding process which comprises steps of defining a narrow gap having a width of 9 to 14 mm and an elongated length, said gap being between a pair of members to be welded which are arranged so as to face each other at a predetermined distance, plastically deforming a consumable elongated electrode between a pair of gears driven with synchronous rotation to form said consumable electrode into a wavelike pattern with opposite crests and with a pitch of about 10 to 20 mm and a molding width as measured from said opposite crests of about 2 to 5 mm, feeding said consumable electrode into a guide cylinder which is movable along the length of said narrow gap so that said consumable electrode is fed and consumed along the length of the gap, and generating an electric arc between the tip of the consumable electrode and the members to be welded to unite them with each other, wherein said consumable electrode, after having been deformed plastically, is fed into said narrow gap with the direction of the tip of said consumable electrode being changed at a high frequency rate in the range of 290–880 cycles/min. so the welding arc is pointed to one after the other facing edges of said members which are alternately welded at said high frequency.

2. A process as in claim 1 and including the step of adjusting and changing the molding width W of the electrode within the range of 2.0 and 5.0 mm while feeding said electrode into said gap.

* * * * *